Aug. 5, 1952  R. E. ESHENAUR ET AL  2,605,514
VINYL RESIN FLOOR COVERING AND METHOD OF
FORMING A SEALABLE PANEL THEREWITH
Filed Aug. 23, 1948  3 Sheets-Sheet 3

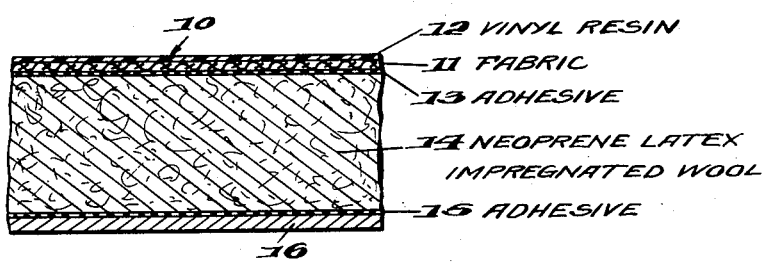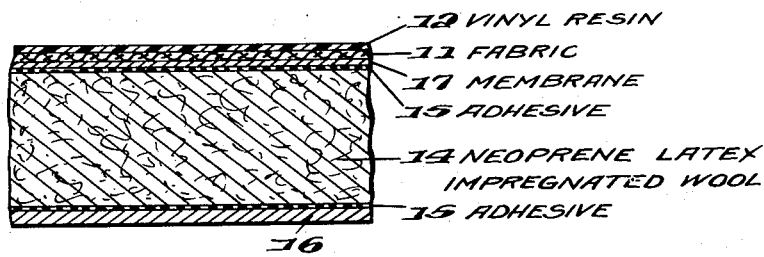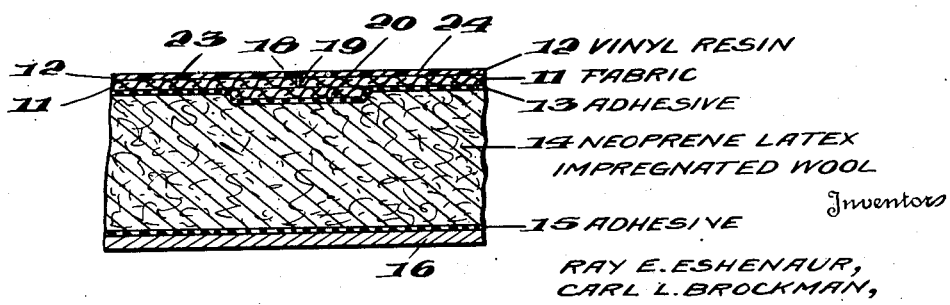

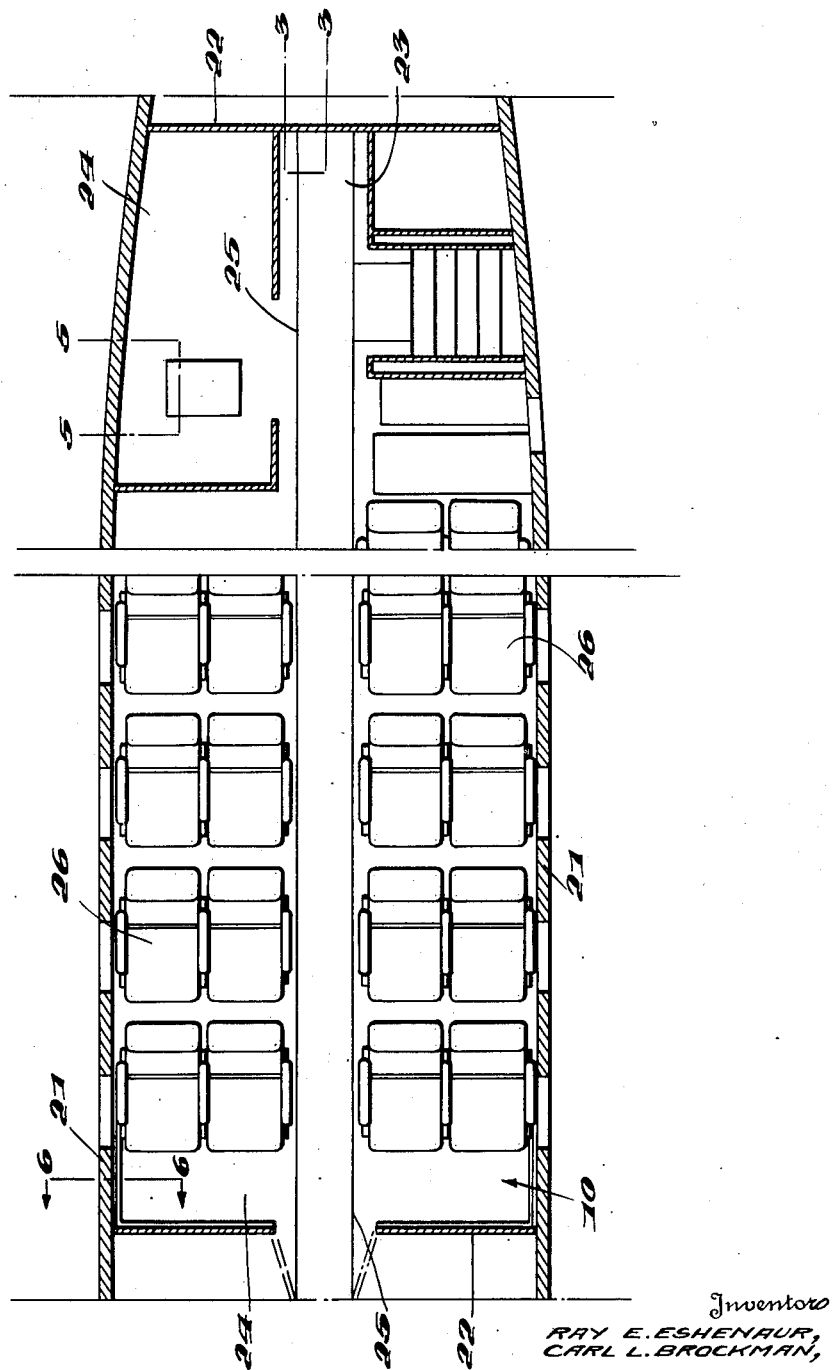

Inventors
RAY E. ESHENAUR,
CARL L. BROCKMAN,

By Donald W. Farrington
Attorney

Patented Aug. 5, 1952

2,605,514

UNITED STATES PATENT OFFICE 2,605,514

VINYL RESIN FLOOR COVERING AND METHOD OF FORMING A SEALABLE PANEL THEREWITH

Ray E. Eshenaur and Carl L. Brockman, Baltimore, Md., assignors to The Glenn L. Martin Company, Middle River, Md., a corporation of Maryland Application August 23, 1948, Serial No. 45,714

14 Claims. (Cl. 20—7)

1

This invention relates to the production of a vinyl resin-coated, resilient, fire resistant floor covering and more particularly to the bonding of strips of coating material formed of vinyl polymers or copolymers together and to a resilient supporting material to produce a unitary covering highly resistant to wear and the absorption of moisture.

Heretofore, it has been considered necessary to cover the floors and aisles of public conveyances, such as aircraft, trains, and busses, with carpeting having a deep pile in order to achieve a floor covering having suitable underfoot resiliency and a reasonable wear value. Such thick carpeting material is not only expensive, but heavy and highly inflammable. It also has the undesirable tendency to absorb moisture which greatly adds to its original weight as well as is inducive to mustiness and decay. Furthermore, such material has a relatively short life when subjected to such service conditions and is very difficult to keep clean as gummy substances, such as chewing gum, as well as food particles become quickly embedded in the nap of the rug are almost impossible to remove without injury to the rug. It is highly desirable and conventional to arrange a floor covering with an aisle strip joined to side areas with seams running lengthwise of the conveyance. This arrangement not only provides for the use of different materials to meet different wear conditions, but allows for pleasing color combinations. However, prior to this time, the seamed juncture points between the strip edges and side areas have presented serious problems of original installation, replacement, and excessive wear.

In the covering of the floor of an aircraft wherein the questions of weight and safety are always important factors, especial problems are presented if the conventional type of heavy carpeting is used, for, in addition to its original heaviness and its tendency to pick up and retain a large quantity of moisture under certain conditions which result in increased weight, it is difficult to render and maintain fire resistant with the degree of certainty desired.

The present invention obviates these difficulties by providing a light-weight, durable covering material, having a luxuriant underfoot feeling that is not only fire resistant and impervious to moisture, but can be seal-joined at juncture points into a unitary covering. This is accomplished, according to the present invention, by providing a fire resistant assembly comprised of a plurality of fabric sheets coated with one of the polyvinyl chloride type resins, secured to a relatively thick layer of neoprene impregnated wool fiber material as a resilient pad which, in turn, is secured to the surface to be covered with the juncture points of the resin coatings welded together and the edges of the coated material sealed to an undersurface support or an adjacent wall so as to retain the full resiliency of the pad while excluding the admission of moisture from the pad.

It is among the objects of this invention to provide a method of producing a wear resistant, resilient floor covering characterized by having a relatively thin vinyl resin-coated fabric sealably secured over a relatively thick layer of neoprene impregnated wool.

Another object is to provide a fire resistant, resilient covering material.

Another object is to provide a floor covering material having a plurality of strips or areas of the same or different colors capable of being weld-joined to form a unitary covering.

A still further object is to provide a covering material that is highly resistant to the absorption of moisture.

Another object is to provide a light weight, inexpensive covering material that is highly resistant to wear and easy to clean.

Other objects of this invention will become apparent from the following description when taken in conjunction with the drawings in which like numbers refer to like parts in different views.

In the drawings:

Figure 1 is an enlarged sectional view of the product of this invention shown attached to a section of metal flooring.

Figure 2 is a similar view of another embodiment showing the use of a pigment-restraining membrane placed between the vinyl resin-coated fabric and the supporting material.

Figure 3 is an enlarged sectional view showing a sealed joint between two separate sheets of the vinyl resin-coated fabric which are shown in their preferred embodiment at 3—3 of Figure 4.

Figure 4 is a fragmentary plan view of an aircraft showing the covering material of this invention in place.

Figure 5:
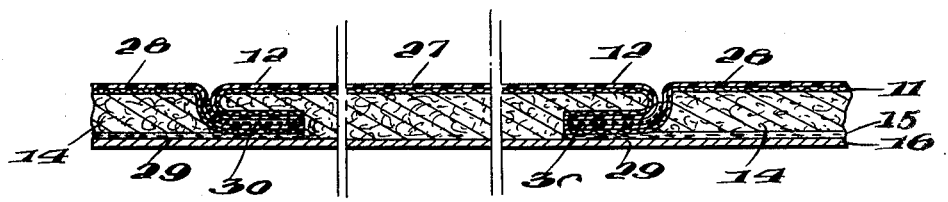
Figure 5 is a fragmentary sectional view taken substantially on line 5—5 of Figure 4.

Referring in detail to the drawings, Figure 1 illustrates the covering material 10 of this invention in which a fabric 11 coated with a layer of vinyl resin 12 is secured by a layer of adhesive 13 to a relatively thick layer or resilient supporting pad 14 of matted wool or hair fibers stabilized and rendered fire resistant by being impregnated with a linear polymer of chloroprene, commonly known in industry as neoprene. This assembly, in turn, is secured to a floor or supporting structure 16 by a second layer of adhesive 15 for use over areas subject to foot traffic.

We have found that sateen material, having a weight of approximately 8 ounces to the square yard, provides a suitable type of fabric as at 11 for use as a base for the vinyl resin coating where a high degree of wear resistance with resiliency comparable to a deep pile carpet is desired. This material is not only relatively light in weight, but also is sufficiently high in tensile and tear strength to withstand this type of service. The vinyl resin coating 12 is preferably embossed on to the fabric 11 so as to add to the wear resistance characteristics of the material and also to attain a pleasing appearance. A number of the thermoplastic resins formed of vinyl polymers or copolymers has been found satisfactory as coating materials. Such a coating having a thickness of 0.02 inch or approximately 8 ounces to the square yard of fabric material has been found to provide an abrasive index in excess of 250 as compared with an index of only 10–20 for the conventional deep-pile type carpet material customarily used in aisleways. The fabric is attached to the neoprene latex impregnated wool pad 14 by a layer of adhesive 13, sprayed on the top surface of the wool pad or applied to the under surface of the fabric. The adhesive 13 is preferably colorless and of a vinyl type compatible with both the coating resin 12 and the neoprene of the wool pad 14. By the reference to a vinyl type adhesive, it is intended to describe any of the vinyl chloride and acetate adhesives containing about 20 per cent of plasticizers which are not migratory, as it has been found that this type of adhesive is capable of absorbing any migratory plasticizer that might come in contact with it and provides a lasting bond that will withstand the great amount of flexing that a covering material would be subjected to under the service conditions described herein.

In order to secure suitable resiliency in areas subject to a great deal of wear, the neoprene latex impregnated wool pad 14 should be of a minimum thickness of from $\frac{1}{8}$ to $\frac{1}{4}$ of an inch, and have a density of approximately 8 pounds per cubic foot. The wool pad 14 is securely affixed to the supporting structure 16 by a second layer of adhesive 15 of any conventional type suitable for adhering a neoprene impregnated material to the support surface. Although the supporting structure is shown as metal, it is to be understood that the floor covering of this invention will give satisfactory service when used with other supporting materials, such as wood, concrete, etc., affixed thereto by an adhesive having the desired characteristics for such application.

In installing transparent covering materials or those of extremely light color where an ordinary adhesive 15, as shown in Figure 2, is to be used, it has been found highly desirable to place a pigment-restraining membrane 17 directly underneath the fabric 11 so as to restrain any tendency, which any of the color pigment in the adhesive or neoprene latex impregnated pad 14 may have, to pass into the coating material and thereby discolor it. The membrane 17 may be of any suitable type material capable of stopping pigment movement, such as cellulose acetate, regenerated cellulose film, or metal foil compatible of adhesion with both the fabric and the wool layer.

In Figure 4 we show a typical installation of the floor covering material of this invention extending between side walls 21 and bulk heads 22 formed at the sides and ends respectively of a conventional aircraft structure. It is to be noted that the aisle area is covered with a separate sheet or strip 23 of covering material 10 from that of the side areas 24 and is joined thereto as at juncture lines 25 extending the entire length of the aircraft. Conventional type aircraft seats 26 are shown illustratively at each side of the aisle secured in place with the covering material of the side areas 24 extended thereunder. The juncture lines 25 are formed by the outer edges of the coating 12 of strip 23 being aligned and heat welded (see Figure 3) to the similar coating of areas 24 to form a unitary covering extending from wall to wall of the aircraft. The elimination of open seams that would otherwise allow admission of water and dirt beneath the floor surface is thereby accomplished. Even though the present floor covering eliminates the problems presented by the conventional type seam, it presents no limitations as to the number and types of sections that may be joined together. Any number of strips and sections may be added together; and while only an aisle strip is shown joined to side areas 24, it is to be understood that the same type of juncturing lends itself well to the insertion of inlays and like arrangements of coatings as desired. A floor covering of this type has unusual utility in that it provides for the use of a darker material where the wear is greatest, such as for the aisle strip 23, as compared with the covering of side areas 24 where the wear is less. Different colored floor coverings are pleasing in appearance, harmonize well with different interior decorating schemes, and also have the added advantage of allowing for sectional replacement if eventually necessitated by wear. By the installation of darker colored strips of material on the aisles and the step approach areas of public conveyances, which areas are subjected to first use by the passengers and are, therefore, dirtied more quickly, by reason of the dirt carried in by the passengers, than the side areas, greatly reduced cost of maintenance is attained without a material loss in appearance. Prior to this time, such an arrangement of different colored floor coverings has presented a serious problem of properly securing the juncture edges of the different materials against exceptional wear and the introduction of moisture and dirt therebetween. Whereas, with the product of this invention, a water-tight, high-strength seam is produced at the juncture lines 25, formed between adjacent sheets of the floor covering, capable of withstanding wear comparable to the covering positioned at either side of said seam. By the welding together of the two vinyl resin coatings to form a unitary structure as shown in Figure 3, a smooth, uniform surface is presented. The vinyl resin coating 12 of aisle strip 23 and covering material of the side area 24 are brought together and heat-welded to form a bonded joint 18 with the fabric 11 of strip 23 and area 24 being brought into butted relationship as at 19. This butted relationship 19 of the fabric layers is maintained and reinforced by the addition of an understrip 20 of sufficient width to overlap each side of the butt joint 19 for adhesive attachment to the fabric layers as shown in Figure 3. The under strip 20 not only provides for reinforcement of the joint 19, but also provides a smooth surface for the adhesive attachment of the joined fabrics to the neoprene impregnated wool layer or pad 14 arranged thereunder.

Figure 5 illustrates the manner in which an access panel 27 as in the floor is formed with the vinyl resin coating 12 and fabric 11 turned under to form a suitable joint with the top surface depressed below the floor level area 28. In forming a joint of this type, the wool pad 14 of the panel 27 is reduced in thickness sufficiently to provide for double thicknesses of the coated fabric 11 turned back to face downward to bear against the covering of area 14 and still retain the original thickness of the panel. The wool pad 14 of the floor level area 28 is cut back a sufficient distance to allow the fabric 11 to be adhesively joined to the supporting structure 16 to form a sealed joint 29 therewith. It is merely necessary that a sufficient amount of the wool pad 14 in the panel 27 be removed to provide for the increased thickness caused by the doubled back arrangement of the coatings 12 and fabrics 11 of the panel seated on the coating of the fabric depressed below the floor level 28 adjacent the supporting structure 16 at point 29. The weight of the panel 27 is normally sufficient to hold it in seated position reasonably secure against admission of moisture; however, in those instances where the panel need not be ready of removal and where an extremely watertight joint is desired, it has been found desirable to apply a bounding layer 30 of adhesive between the doubled back coating of panel 27 and the depressed coating of the adjacent section. Panels of this type are suitable for use at locations where access to areas below the floor line is necessary for maintenance or other purposes.

Figure 6:
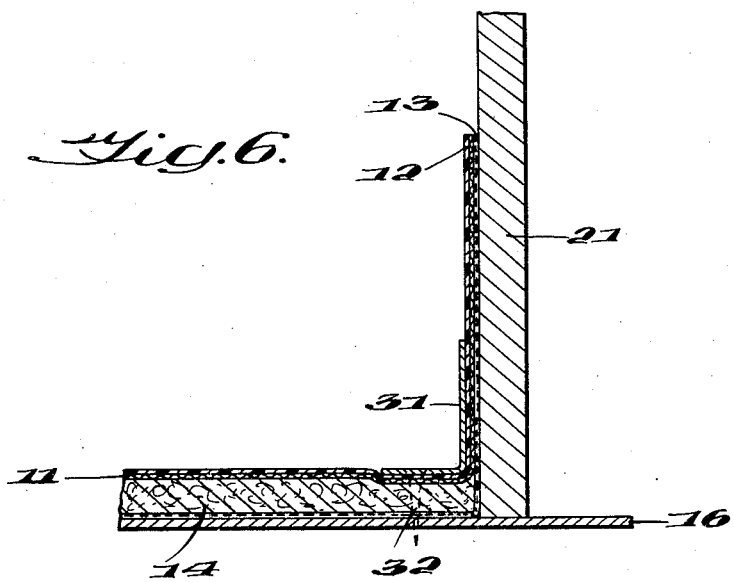
Figure 6 is a fragmentary sectional view taken substantially on line 6—6 of Figure 4.

In order to effect a sealed-in condition adjacent the walls 21 and bulkheads 22 relative to the resilient wool pad 14, the outer coating 12 and fabric 11 are extended a suitable distance up each of the vertical members as shown in Figure 6, and attached thereto by a coating of adhesive 13. The wool pad 14 is laid horizontally with the floor structure with edges terminated at the wall or bulkhead as the case may be. A metal angle plate 31 placed adjacent the walls 21 and bulkheads 22 and held in place by suitable securing means, such as screws 32, provides an attractive scuff plate that also serves to hold the floor covering material in place adjacent the wall structure. Angle plate 31 is drawn down sufficiently against the floor covering material by screws 32 to form a gasket-like seal, extending around the entire periphery of the floor area so as to exclude the admission of water which might gather on the floor areas and which might otherwise penetrate into the resilient undersurface material. Being sealed to the admission of moisture, such a floor covering has the advantage of being easily cleaned by washing with water in the usual manner as a regular maintenance operation.

Our method of forming the floor covering of this invention is as follows:

The wool pad 14 is adhesively attached to the floor 16 to be covered. We have attained the best results by adhering approximately one square yard of material at a time. A section of fabric 11 coated on one side with resin 12 of the desired color is uniformly coated on the side opposite from the resin with an adhesive. Upon the adhesive becoming tacky, the fabric is smoothly spread over the wool pad 14 and pulled down to attain a smooth surface. The above applies to the installation of that portion of a section that is spaced from an upright surface, such as a wall or bulkhead or another section. In sealing the edges at the walls and bulkheads, the fabric is extended up said members a sufficient distance to act as a base board and evenly adhered directly to said member as best illustrated by Figure 6. Overlapping of the covering material at the corners may be avoided by removal of sufficient fabric to allow for a butt joint with the covering cemented to an upright member. In joining different sections together as at 3—3 of Figure 4 where a juncture line is to be formed between the different colored covering of the aisle strips 23 and the seat area 24, the two pieces of covering are laid face to face. The edges to be joined are brought into alignment and clamped together with about $\frac{1}{16}$ of an inch of the edges exposed beyond the clamped area. The vinyl resin of the exposed edges is then softened and welded together by the application of heat. We have secured excellent results by using an electric soldering iron to weld the vinyl resin coatings together as well as an electric sewing machine heated sufficiently to cause uniform flow of the resin. The joined materials are then allowed to cool thoroughly after which the two sections are unfolded for further handling. A strip 20 (Figure 3) of fabric is adhesively applied over the butt joint 19 formed by the edges of the two pieces of fabric 11 as a seat for the joint. The joined sections are then adhesively secured to the underlying pad 14 as previously discussed in connection with the laying of the other sections.

The metal angle plate 31 is then placed adjacent the wall and bulkhead members and fastened in place with suitable securing means, such as screws 32, so as to draw the covering material down tight with a portion of the pad 14 placed in compression sufficiently to effect a gasket-like seal between the covering and the floor member.

Although wool fiber material has been described as most desirable for use in forming the resilient layer or pad 14, other materials capable of being rendered fire resistant may be used in the manner disclosed by the invention as found desirable by reason of their lower cost or availability. Likewise, it is to be understood that although applicants have described the use of sateen cloth as a base for the resin coating, the use of other materials, such as glass cloth, woven asbestos, etc., would prove satisfactory within certain operating limitations.

While we have described our invention in detail in its preferred embodiment, it will be obvious to those skilled in the art after understanding our invention that various changes, alterations, modifications, and substitutions can be made thereon without departing from the spirit and scope of our claims.

We claim as our invention:

1. A floor covering for a structure having a floor member and an upright wall member comprising a resilient pad adapted for securing to the floor member with an edge of said pad placed adjacent the wall member in substantially abutting relation thereto, a vinyl resin coated fabric secured to said pad by a layer of vinyl resin adhesive compatible with said vinyl resin coating having its corresponding edge portion extended beyond the pad and upwardly along the wall member and sealably secured thereto, a metal plate positioned adjacent the edge of said pad having a surface parallel to said floor with securing means extended through said plate, the fabric, and pad into engagement with the floor member to place the edge of said pad under compression with the plate in contact with the vinyl coated fabric.

2. A method of producing a sealed floor covering for a structure having a floor member which comprises the steps of coating the floor member with an adhesive, laying a resilient pad of matted hair impregnated with a linear polymer of chloroprene to the coated surface of the floor member, preparing a vinyl resin coated fabric for adhesive attachment to said pad by coating the underside of said fabric with a coating of vinyl resin adhesive, allowing said adhesive to become tacky, spreading the fabric over the pad with edges extended beyond said pad for attachment to the adjacent structure, and sealing the extended edges of the fabric directly to the structure to form a sealed covering over the supporting pad.

3. A method of producing a sealed floor covering for a structure having a floor member which comprises the steps of coating the floor member with an adhesive, laying a resilient pad of matted hair impregnated with a linear polymer of chloroprene to the coated surface of the floor member, preparing a vinyl resin coated fabric for adhesive attachment to said pad by coating the underside of said fabric with a coating of vinyl resin adhesive, allowing said adhesive to become tacky, spreading the fabric over the pad with edges extended beyond said pad for attachment to the adjacent structure, and sealing the extended edges of the fabric directly to the structure under compression to form a sealed covering over the supporting pad.

4. A method of producing a floor covering composed of a plurality of sheets as a unitary covering extending from wall to wall of an enclosure which comprises the steps of adhesively securing a resilient pad to the floor member, aligning one edge of two different sheets of vinyl resin coated fabric with the vinyl resin coatings together, clamping said edges together at a point spaced inwardly of the sheet edges, joining the vinyl resin coatings of said sheets together by the application of heat sufficient to cause flow of said resin, allowing the heated resin to cool, unfolding the joined sheets to bring the edges of the fabric of each sheet into butted relation to each other, covering said butted edges with a strip of adhesively attached fabric spaced inwardly of the resin coated surface, and adhesively securing said joined sheets to the resilient pad to form a unitary covering with edges adapted for sealed securing to the wall members.

5. A method of forming a sealable panel in a resilient floor covering which comprises securing a resilient pad to a floor member adjacent an area to be closed with a panel, covering said pad with a vinyl resin coated fabric with the edge of said fabric extended beyond the resilient pad and adhesively secured directly to said floor member, forming a panel for said area to be closed of impregnated wool fiber formed to the same thickness as the adjacent pad except for the edge of the under side adapted for positioning adjacent the floor member, said last mentioned edge having a reduced thickness area, securing a section of vinyl resin coated fabric of greater area than the panel to the wool fiber pad with the edge turned under and positioned in said reduced thickness area for contactual engagement of the panel coated fabric on the first mentioned coated fabric secured to the floor member.

6. A method of forming a sealable panel in a resilient floor covering which comprises securing a resilient pad to a floor member adjacent an area to be closed with a panel, covering said pad with a vinyl resin coated fabric with the edge of said fabric extended beyond the resilient pad and adhesively secured directly to said floor member, forming a panel for said area to be closed of impregnated wool fiber formed to the same thickness as the adjacent pad except for the edge of the under side adapted for positioning adjacent the floor member, said last mentioned edge having a reduced thickness area, securing a section of vinyl resin coated fabric of greater area than the panel to the wool fiber pad with the edge turned under and positioned in said reduced thickness area for contactual engagement of the panel coated fabric on the first mentioned coated fabric secured to the floor member, and adhesively joining together of the vinyl resin coated surfaces in contactual engagement with each other.

7. Floor panel construction in connection with a floor member comprising a resilient pad formed with a panel opening edge adhesively secured to a floor, a coated fabric covering sheet adhesively secured to said pad with said covering sheet having an edge portion extended beyond the pad edge and secured directly to the floor member, a panel formed of hair fibers having a top side covered with a coated fabric complementary to the aforementioned covering sheet with an edge area of said coated fabric being extended around the edge of the panel to form a seat area parallel with the top side of the panel, said panel being substantially of the same thickness as the pad and covering sheet with said extended edge area of the panel seated on the extended edge portion of said covering sheet.

8. A floor covering material comprising a resilient base pad of substantial thickness adapted to be directly secured to a floor and formed of matted hair fibers stabilized and rendered fire resistant by being impregnated with a linear polymer of chloroprene, a relatively thin, flexible, vinyl resin-coated cloth fabric having its resin-coated side facing upwardly and constituting the upper, wearing surface of said floor covering, said fabric being secured directly to said base pad by a layer of vinyl resin adhesive compatible with said vinyl resin coating and the linear polymer of chloroprene impregnation of said pad.

9. A floor covering material comprising a pigment bearing resilient base pad of substantial thickness adapted to be directly secured to a floor and formed of matted wool fibers stabilized and rendered fire resistant by being impregnated with a linear polymer of chloroprene, a relatively thin, flexible, vinyl resin-coated cloth fabric having its resin-coated side facing upwardly and constituting the upper, wearing surface of said floor covering, said fabric being secured directly to said base pad by a layer of vinyl resin adhesive compatible with said vinyl resin coating and the linear polymer of chloroprene impregnation of said pad, said adhesive acting as a barrier to migration of pigment between the pad and the fabric.

10. A floor covering material comprising a resilient base pad of substantial thickness adapted to be directly secured to a floor and formed of matted hair fibers, a relatively thin, flexible, vinyl resin-coated cloth fabric having its resin-coated side facing upwardly and constituting the upper, wearing surface of said floor covering, said fabric being secured directly to said base pad by a layer of vinyl resin adhesive compatible with said vinyl resin coating.

11. A floor covering material comprising a pigment bearing resilient base pad of substantial thickness adapted to be directly secured to a floor and formed of matted wool fibers, a relatively thin, flexible, vinyl resin-coated cloth fabric having its resin-coated side facing upwardly and constituting the upper, wearing surface of said floor covering, said fabric being secured directly to said base pad by a layer of vinyl resin adhesive compatible with said vinyl resin coating, said adhesive acting as a barrier to migration of pigment between the pad and the fabric.

12. A floor covering material comprising a resilient base pad of substantial thickness adapted to be directly secured to the floor of a structure and formed of matted hair fibers impregnated with a linear polymer of chloroprene, a relatively thin, flexible, vinyl resin-coated cloth fabric having its resin-coated side facing upwardly and constituting the upper, wearing surface of said floor covering, said fabric being secured directly to said base pad by a layer of vinyl resin adhesive compatible with said vinyl resin coating.

13. A floor covering material comprising a resilient base pad of substantial thickness adapted to be directly secured to the floor of a structure and formed of matted hair fibers impregnated with a linear polymer of chloroprene, a relatively thin, flexible, vinyl resin-coated cloth fabric having its resin-coated side facing upwardly and constituting the upper, wearing surface of said floor covering, said fabric being secured directly to said base pad by a layer of vinyl resin adhesive compatible with said vinyl resin coating and having its edge portion extended beyond the edges of said pad and into sealed engagement with said structure to effect exclusion of moisture from said pad.

14. A floor covering material comprising a resilient base pad of substantial thickness adapted to be directly secured to a floor and formed of matted hair fibers, a plurality of relatively thin, flexible sheets of cloth fabric each having its upper surface coated with a polyvinyl chloride resin, adjacent sheets having their resin coatings fused together along the contacting edges thereof to form a smooth, unbroken unitary coating, said sheets being secured directly to said pad by a vinyl resin adhesive compatible with the vinyl resin of the unitary coating.

RAY E. ESHENAUR.
CARL L. BROCKMAN.

REFERENCES CITED

The following references are of record in the file of this patent:

UNITED STATES PATENTS

| Number | Name | Date |
|---|---|---|
| 298,095 | Kleinert | May 6, 1884 |
| 1,319,879 | Lindley | Oct. 28, 1919 |
| 1,967,105 | Seymour | July 17, 1934 |
| 1,967,863 | Collins et al. | July 24, 1934 |
| 2,129,110 | Weaver | Sept. 6, 1938 |
| 2,202,977 | Woodall | June 4, 1940 |
| 2,209,247 | Dildilian | July 23, 1940 |
| 2,227,212 | Beck | Dec. 31, 1940 |
| 2,246,101 | McEnany | June 17, 1941 |
| 2,425,805 | Hyman | Aug. 19, 1947 |
| 2,430,934 | Kemmeler et al. | Nov. 18, 1947 |
| 2,506,915 | Bishop | May 9, 1950 |